US006977898B1

(12) United States Patent (10) Patent No.: US 6,977,898 B1
Miriyala (45) Date of Patent: Dec. 20, 2005

(54) METHOD FOR SUPPORTING HIGH PRIORITY CALLS ON A CONGESTED WAN LINK

(75) Inventor: Prasad Miriyala, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/419,169

(22) Filed: Oct. 15, 1999

(51) Int. Cl.$^7$ .............................. H04J 1/16; H04L 1/00
(52) U.S. Cl. ................ 370/236; 370/236.1; 370/236.2; 370/237; 370/238; 370/238.1; 379/221.01; 379/22.02; 379/221.03; 379/221.06
(58) Field of Search .............................. 370/229, 230, 370/230.1, 231, 236, 236.1, 236.2, 477, 521, 370/468, 437, 232, 235, 237, 238, 238.1; 379/207.01, 221.01, 221.02, 221.03, 221.06, 379/221.07; 375/222, 240.02

(56) References Cited

U.S. PATENT DOCUMENTS

| | | | |
|---|---|---|---|
| 4,747,130 A | 5/1988 | Ho | |
| 4,862,452 A | 8/1989 | Milton et al. | |
| 4,955,054 A | 9/1990 | Boyd, Jr. et al. | |
| 4,991,169 A | 2/1991 | Davis et al. | |
| 5,150,357 A | 9/1992 | Hopner et al. | |
| 5,224,099 A | 6/1993 | Corbalis et al. | |
| 5,313,454 A | 5/1994 | Bustini et al. | |
| 5,359,592 A | 10/1994 | Corbalis et al. | |
| 5,367,678 A | 11/1994 | Lee et al. | |
| 5,410,599 A | 4/1995 | Crowley et al. | |
| 5,434,981 A | 7/1995 | Lenihan et al. | |
| 5,440,740 A | 8/1995 | Chen et al. | |
| 5,442,789 A | 8/1995 | Baker et al. | |
| 5,452,306 A | 9/1995 | Turudic et al. | |
| 5,457,687 A * | 10/1995 | Newman ................ 370/232 |
| 5,497,373 A | 3/1996 | Hulen et al. | |
| 5,515,363 A | 5/1996 | Ben-Nun et al. | |
| 5,526,344 A | 6/1996 | Diaz et al. | |
| 5,528,595 A | 6/1996 | Walsh et al. | |
| 5,546,395 A * | 8/1996 | Sharma et al. ............. 370/468 |
| 5,561,663 A | 10/1996 | Klausmeier | |
| 5,594,727 A | 1/1997 | Kolbenson et al. | |
| 5,602,848 A | 2/1997 | Andrews et al. | |
| 5,615,211 A | 3/1997 | Santore et al. | |
| 5,617,423 A * | 4/1997 | Li et al. .................... 370/426 |

(Continued)

FOREIGN PATENT DOCUMENTS

GB 2200816 A 8/1988

(Continued)

OTHER PUBLICATIONS

Doug O'Leary, "Frame Relay/ATM PVC Service Interworking Implementation Agreement," Frame Relay Forum, pp. 1-24, Apr. 14, 1995.

(Continued)

*Primary Examiner*—Wellington Chin
*Assistant Examiner*—Raj Jain
(74) *Attorney, Agent, or Firm*—Blakely, Sokoloff, Taylor & Zafman LLP

(57) ABSTRACT

A network node is configured to negotiate for connections for high priority calls (e.g., voice calls) received at the node in the face of otherwise congested outbound communication links. The negotiation is conducted in a fashion that will preserve connections for existing calls associated with the node. For example, the negotiation may be conducted so as to cause one or more of the existing calls to consume less bandwidth over the outbound communication links than was consumed at a time prior to reception of the high priority calls. Such negotiations may be initiated depending on the availability of codec resources and/or compression schemes at the node and may be conducted using OAM cells.

17 Claims, 2 Drawing Sheets

U.S. PATENT DOCUMENTS

| | | | |
|---|---|---|---|
| 5,623,491 | A | 4/1997 | Skoog |
| 5,625,845 | A | 4/1997 | Allran et al. |
| 5,719,865 | A | 2/1998 | Sato |
| 5,724,513 | A | 3/1998 | Ben-Nun et al. |
| 5,734,656 | A | 3/1998 | Prince et al. |
| 5,742,596 | A | 4/1998 | Baratz et al. |
| 5,745,490 | A | 4/1998 | Ghufran et al. |
| 5,748,468 | A | 5/1998 | Notenboom et al. |
| 5,765,032 | A | 6/1998 | Valizadeh |
| 5,771,232 | A | 6/1998 | Sinibaldi et al. |
| 5,777,984 | A * | 7/1998 | Gun et al. ............ 370/230 |
| 5,793,747 | A | 8/1998 | Kline |
| 5,835,494 | A | 11/1998 | Hughes et al. |
| 5,838,994 | A | 11/1998 | Valizadeh |
| 5,862,211 | A | 1/1999 | Roush |
| 5,883,804 | A | 3/1999 | Christensen |
| 5,894,477 | A | 4/1999 | Brueckheimer et al. |
| 5,909,443 | A * | 6/1999 | Fichou et al. ............ 370/412 |
| 5,974,033 | A | 10/1999 | Kamiya et al. |
| 6,002,666 | A | 12/1999 | Fukano |
| 6,005,868 | A | 12/1999 | Ito |
| 6,009,507 | A | 12/1999 | Brooks et al. |
| 6,011,780 | A | 1/2000 | Vaman et al. |
| 6,028,858 | A | 2/2000 | Rivers et al. |
| 6,052,375 | A | 4/2000 | Bass et al. |
| 6,058,117 | A | 5/2000 | Ennamorato et al. |
| 6,069,872 | A * | 5/2000 | Bonomi et al. ............ 370/236 |
| 6,104,721 | A | 8/2000 | Hsu |
| 6,118,864 | A | 9/2000 | Chang et al. |
| 6,128,301 | A | 10/2000 | Bernstein |
| 6,144,637 | A | 11/2000 | Calvignac et al. |
| 6,157,648 | A | 12/2000 | Voit et al. |
| 6,181,694 | B1 | 1/2001 | Pickett |
| 6,266,342 | B1 | 7/2001 | Stacey et al. |
| 6,272,109 | B1 | 8/2001 | Pei et al. |
| 6,307,866 | B1 * | 10/2001 | Hayter ............ 370/468 |
| 6,311,288 | B1 | 10/2001 | Heeren et al. |
| 6,337,858 | B1 | 1/2002 | Petty et al. |
| 6,343,326 | B2 * | 1/2002 | Acharya et al. ............ 709/238 |
| 6,426,955 | B1 | 7/2002 | Gossett Dalton, Jr. et al. |
| 6,449,269 | B1 | 9/2002 | Edholm |
| 6,483,835 | B1 | 11/2002 | Tanigawa et al. |

FOREIGN PATENT DOCUMENTS

| | | |
|---|---|---|
| WO | 94/16528 | 7/1994 |

OTHER PUBLICATIONS

Gary Lee, et al., "A Management Briefing on Frames to Cells, Frame Relay and Frame UNI in ATM Networks," General DataComm, pp. 1-12 (1997).

Addison Ching, "CEDPA Launches Discussion Lists," Oct.-Nov. 1997, The DataBus, vol. 37, No. 6, pp. 1-10 (Huntington Beach, CA, Oct.-Nov. 1997).

B. Thompson, et al., "DSP Resource Manager Interface and its Role in DSP Multimedia," IEEE, pp. 291-298, 1994.

Edward B. Morgan, "Voice Over Packet, White Paper," Telogy Networks, pp. 1-13, 1997.

S. Mangiapane, "Cisco Announces MC3810 Multiservice Access Concentrator," The Databus, vol. 37, No. 6, pp. 1-3, Oct.-Nov. 1997.

Voice Over Frame Relay Implementation Agreement, FRC 11.1, Frame Relay Forum Technical Committee, pp. I-vi and 1-46 (Revision History: FRF. May 11, 1997; FRF .11.1 Annex J Added Dec. 1998).

Annex B to Voice Over Frame Relay Implementation Agreement, FRF .11, Frame Relay Forum Technical Committee, pp. B-1 & B-2 (May 1997).

R. Iyer & Cisco Systems, A TDM Interface for the TMS320C54X DSP, Application Report: SPRA453, Digital Signal Processing Solutions (Texas Instruments Jun. 1998).

"ATM Trunking using AAL2 for Narrowband Services" The ATM Forum Technical Committee, AF-VTOA-0113.000, Feb. 1999, 58 pages.

International Search Report mailed Jun. 23, 2000 for counterpoint International Application No. PCT/US99/29690.

"Task Management of Multiple Digital Signal Processors," IBM Technical Disclosure Bulletin, Vo. 34, No. 7B, pp. 237-239, Dec. 1991).

* cited by examiner

METHOD FOR SUPPORTING HIGH PRIORITY CALLS ON A CONGESTED WAN LINK

FIELD OF THE INVENTION

This invention relates to resource allocation within a computer or other network. More particularly, the present invention relates to the allocation of bandwidth in a Digital Communications Network.

BACKGROUND

FIG. 1 generally depicts a digital network 100 adapted to transport voice, data and other information. This exemplary network will be used to illustrate some of the drawbacks associated with present networking communication methodologies and equipment. The network includes a plurality of nodes 102, 104 (hereinafter "network nodes"), each of which may be coupled to various customer premises equipment (CPE) (not shown) and/or other network nodes (not shown). Network nodes 102 and 104 are communicatively coupled to one another through a communication link 106, which may be a wired or wireless communication link. In this network 100, nodes 102 and 104 communicate across communication link 106 using the well-known Asynchronous Transfer Mode (ATM) protocol. Thus, at each end of communication link 106, ATM interfaces 108 are employed. Communication between nodes 102 and 104 with various CPE and/or other nodes is supported across communication links 108 and 110, respectively, each of which is associated with an appropriate interface 112, 114 at its respective node.

When a communication (e.g., a voice communication) is to be transported within network 100, the signal first travels from the associated CPE equipment (e.g., a private branch exchange or PBX) to node 102 over communication link (e.g., digital T1 carrier) 108. Before being transmitted over such a T1 carrier, the signal is sampled and converted to a digital signal. A common sampling rate used with voice communications is 8000 samples per second, with each digital sample represented by 8 bits of data. Thus, the data rate of the new digital signal is: 8000 samples/sec×8 bits=64,000 bits/sec. This technique is known as Pulse Code Modulation (hereinafter "PCM") and is used extensively throughout the backbone of modern telephone systems.

Although no international standard has been adopted, the T1 carrier is one method of PCM used throughout North America and Japan. The T1 carrier is comprised of 24 channels of digital data multiplexed together. Digitally sampled data from each of the 24 channels are packaged into successive frames of 8 bits/channel×24 channels+an additional framing bit=193 bits. Outside of North America and Japan a similar standard, known as E1, is commonly implemented. E1 operates in a manner similar to T1 except that it uses 32, 8-bit data samples (i.e., 32 channels) instead of 24.

After the signal has been sampled, converted to a digital signal and transmitted over a T1 carrier, as described above, it is then transferred to an outgoing communication link 106. Because the transport protocol across communication link 106 is different than that used on communication link 108, the digital data samples are packaged according to the protocol used across communication link 106 (e.g., ATM) before being transmitted to node 104. Additionally, although PCM by itself provides for a data transfer rate of 64,000 bits/second, it is often desirable to further compress the digital PCM data in order to save bandwidth within the network. This can be accomplished using Digital Signal Processing (hereinafter "DSP") resources associated with network node 102. For example, if the 64,000 bits/second PCM signal is compressed by a DSP resource at a compression ratio of 16:1, the resulting digital signal will be transmitted at 4,000 bits/second. This represents a significant reduction in required bandwidth across network 100 to transmit the same underlying signal. Such compression techniques are particularly useful in networks that are heavily loaded with network traffic. Examples of compression algorithms known in the art include the International Telegraph Union (hereinafter "ITU') standards G.711, G.726, G.729-A, G.729, and G.728. Such compression resources may be associated with the ATM interfaces 108 and may operate under the control of a node controller 116 in each of the nodes.

However, there is a tradeoff between bandwidth savings over network 100 and the implementation of costly DSP resources at the nodes. In general, the higher the compression ratio required by the compression algorithm, the more DSP resources are used up processing the compression request over a given period of time. Thus, while a single DSP resource may process up to say 16 channels of data if no compression is used (i.e., in baseline PCM mode), it may be limited to 5 channels if data is compressed at 2:1, and only 2 channels if the PCM signal is compressed at 8:1. One factor behind this limitation is the limited period of time in which the DSP resource must compress the data within a T1 frame before it must move on to the next frame of data. Thus, the chosen compression ratio will have a significant impact on DSP resource usage.

Following compression (if used), the data samples are delivered through network 100 to node 104, where the data may be decompressed and passed on to other CPEs or another node. The system is bi-directional to ensure 2-way communication between the nodes.

One problem with the communication scheme adopted in network 100 occurs when communication link 106 becomes congested, that is, when there is no available bandwidth to support new incoming calls from a CPE coupled to node 102. Consider, for example, a situation where multiple calls being transported between nodes 102 and 104 are using all or almost all of the available bandwidth on communication link 106. If a high priority call (e.g., a 911 or other emergency call) is now received at network node 102, either of two scenarios is possible. First, the high priority call may be rejected (dropped) in the face of no available bandwidth. Second, rather than dropping the high priority call (clearly a least acceptable solution); the nodes may be configured to drop lower priority calls in order to free up bandwidth to accommodate the high priority call. Although this solution may allow the high priority call to proceed, it is less than satisfactory in as much as several existing calls may be dropped to support the one new call. What is needed, therefore, is a more robust mechanism for handling such situations.

SUMMARY OF THE INVENTION

In one embodiment, a network node is configured to negotiate for connections for high priority calls (e.g., voice calls) received at the node in the face of otherwise congested outbound communication links. The negotiation is conducted in a fashion that will preserve connections for existing calls associated with the node. For example, the negotiation may be conducted so as to cause one or more of the existing calls to consume less bandwidth over the outbound communication links than was consumed at a time prior to reception of the high priority calls. Such negotiations may be initiated depending on the availability of codec resources and/or compression schemes at the node.

Another embodiment provides a method of managing a communication link between nodes of a communication network so as to ensure connection availability for one or more high priority calls over the communication link through dynamic renegotiations of call parameters for existing calls (e.g., voice calls) transported over the communication link. The communication link may preferably support communications according to the Asynchronous Transfer Mode and the dynamic renegotiations may be negotiations of compression schemes for the calls. Such dynamic renegotiations may be supported according to codec availability (e.g., as determined according to profile information) at the nodes and may be accomplished through the exchange of OAM cells between the nodes. In such a scheme, the high priority calls may be determined as such according to database information regarding called numbers.

Still another embodiment provides a network having a number of nodes connected through one or more communication links and a resource manager configured to allocate bandwidth over the communication links to high priority calls received at one or more of the nodes without dropping existing calls within the network. The resource manager allocates bandwidth through dynamic renegotiations of existing bandwidth utilization within the network and may be a distributed resource among the nodes of the network. Preferably, the nodes each support multiple codec resources, which compress voice information transmitted over the communication link. The dynamic renegotiations are supported through the exchange of OAM cells between the nodes.

BRIEF DESCRIPTION OF THE DRAWINGS

The present invention is illustrated by way of example and not limitation in the figures of the accompanying drawings, in which.

DETAILED DESCRIPTION

Described herein is a method for accommodating high priority calls on a congested communication link of a wide area or other communication network. In the following discussion, examples of specific embodiments of the present invention are set forth in order to provide the reader with a through understanding of the present invention. However, many of the details described below can be accomplished using equivalent methods or apparatus to those presented herein. Accordingly, the broader spirit and scope of the present invention is set forth in the claims that follow this detailed description and it is that broader spirit and scope (and not merely the specific examples set forth below) that should be recognized as defining the boundaries the present invention.

Figures 2, 3:
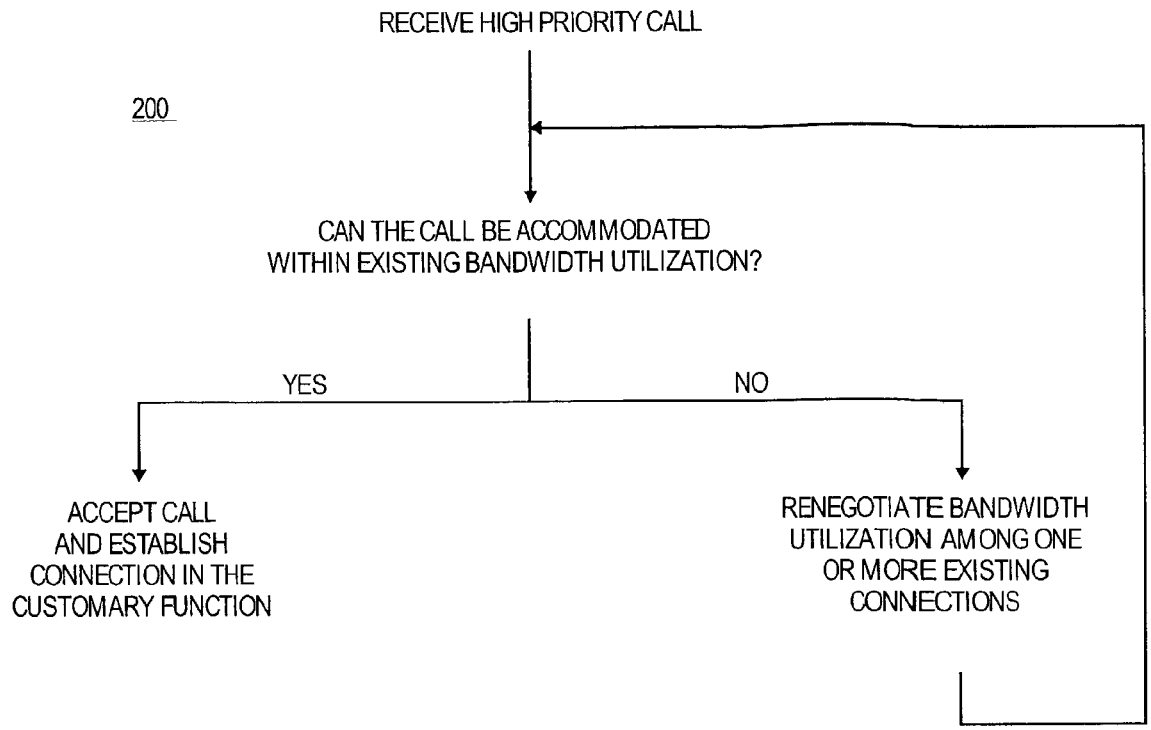
FIG. 2 shows an example of a process for renegotiating compression or other call parameters on the fly in accordance with an embodiment of the present invention.
FIG. 3 shows an example of a database for mapping incoming calls to outbound channels at a node of a communication network in accordance with an embodiment of the present invention.

The basic mechanism adopted in the present invention is easily understood with reference to FIG. 2. Process 200 describes a bandwidth renegotiation scheme for accommodating high priority calls over otherwise congested communication links in a wide area or other communications network. When a high priority call is received at a node of the network, a check is made to determine whether the call can be accommodated within the existing bandwidth utilization in the network.

Figure 1:
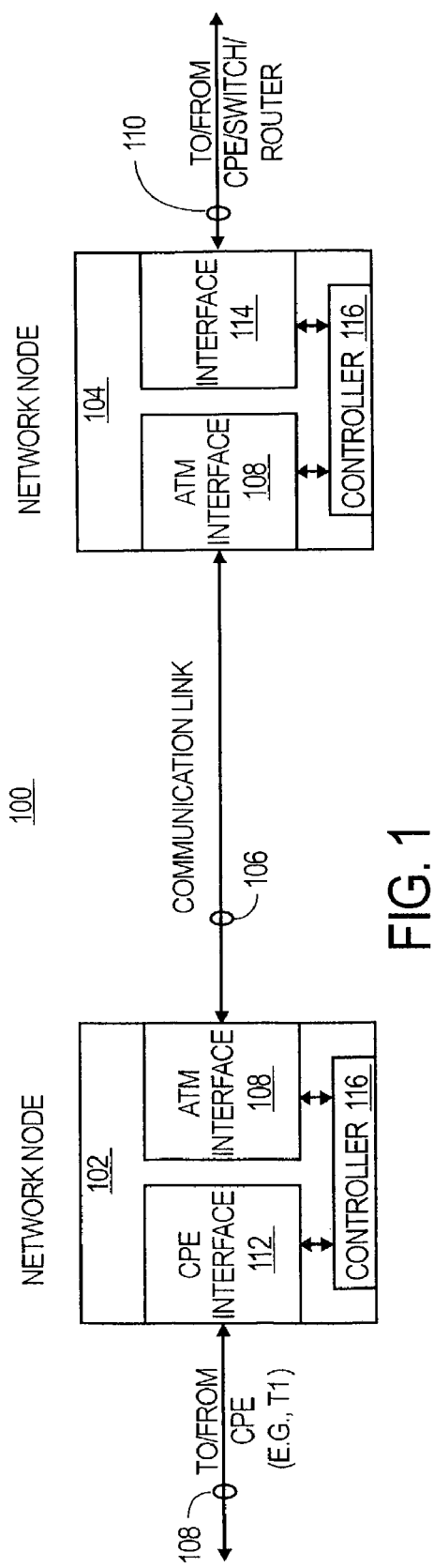
FIG. 1 shows generally a data network that can be configured in accordance with the present invention.

For example, in the network 100 illustrated in FIG. 1, if a high priority call is received at node 102, controller 116 may be configured to determine whether the call can be accommodated on communication link 106 according to the existing bandwidth utilization thereof. If the call can be so accommodated, it is connected in the customary fashion. If the call cannot be so accommodated, however, the present bandwidth renegotiation scheme is employed to free up bandwidth on communication link 106 to the point where the high priority call can be accommodated. Rather than simply dropping calls, by renegotiating the bandwidth utilization among existing calls, these calls as well as the new high priority call can be accommodated within network 100.

To more fully appreciate the processes involved in the present scheme, it is helpful to understand how calls are handled in network 100 in accordance with the present invention. When a call is received from a CPE at node 102, it is mapped to an associated network address. For example, associated with controller 116 may be a database configured to provide appropriate mappings between dialed telephone numbers and network (e.g., ATM or Internet protocol (IP) addresses). An example of such a database 300 is shown in FIG. 3. In this example, the telephone number (123) 456-7891 is mapped to the network address 123.221.456.78.

For the case of ATM network 100, this network address is associated with a virtual circuit (e.g., a permanent virtual circuit or PVC) between network nodes 102 and 104, supported on communication link 106. Thus, when the incoming call is parsed at node 102, the dialed number may be extracted to determine the node for which the call is destined, according to the network address. In some cases, the dialed number and/or associated network address may be flagged as a high priority call. For example, the dialed number 911 may be flagged as a call of the highest possible priority (e.g., where more that two priority levels are available). In this way, incoming calls can be recognized as high priority or not.

As mentioned above, for voice calls a variety of compression schemes are available, depending upon the codec (coder-decoder) resources available at the end points of the communication link over which the call is transported. Each call (e.g., each inbound TI channel at node 102) may negotiate for a particular compression scheme to be employed at the time a connection is established, or a default compression scheme may be used where no negotiation takes place. In accordance with the present invention, each voice port supported by the ATM interfaces 108 has a profile defining the available codec resources for that port. Incoming calls are mapped to these voice ports for communications across communication link 106 and in one embodiment, ATM interfaces 108 may each have up to 24 voice ports.

The profiles of the voice ports may be established by a network manager at the time PVCs are set up within network 100. Alternatively, or in addition, profiles may be exchanged between ports as part of a call set up process in the case of switched virtual circuits (SVCs). On mechanism for the exchange of such profiles is the ATM Adaptation Layer type 2 (AAL2) protocol. Recently, the ATM Forum has promulgated standards document af-vota-0113.000, entitled "ATM Trunk Networking Using AAL2 for Narrowband Services" (February 1999). In that document, which is incorporated herein by reference as is set forth in its entirety, a scheme for selecting and managing encoding algorithms at nodes of an ATM network according to prearranged agreements is described. This scheme calls for the exchange of profile information in a manner suitable for use in accordance with the present invention.

By exchanging profiles, each node at an end of a communication link is aware of the codec (e.g., DSP) resources available at each corresponding voice port. Thus, the nodes can reach an agreement on which codec (i.e., which compression scheme) to use for a particular call. As noted above, compression schemes that provide high compression ratios tend to utilize less bandwidth than those that use low compression ratios do. So, assuming that sufficient codec resources are available, when an incoming high priority call is recognized, if there is insufficient bandwidth available on communication link 106 to accommodate the new call, node 102 can instruct node 104 to adopt new compression schemes on one or more voice channels (i.e., calls) so as to free up bandwidth on communication link 106 to support the new call. This process can be repeated, as required, until no available codec resources remain.

The renegotiation process described above may be implemented using OAM (operations, administration and maintenance) cells that are exchanged between nodes 102 and 104. OAM cells are often exchanged between nodes of an ATM network and are used to convey a variety of information. In accordance with the present invention, the OAM cells are configured with payloads (e.g., cell type, function type and/or function specific fields) that contain instructions for moving to different compression schemes, and acknowledgements thereto. The format and use of OAM cells are well known in the art and need not be further described herein. What is unique is the use of such cells (which may be transmitted from a high priority queue within a node so as to ensure rapid call handling) to negotiate compression schemes for a channel on the fly.

Thus, a scheme for bandwidth renegotiation for accommodating high priority calls has been described. Although discussed with respect to specific embodiments, however, the broader applicability of the present invention should not be limited thereby. For example, although discussed with respect to the negotiation of compression schemes on the fly, other call parameters or connection parameters could be so negotiated on the fly. Thus, this broader applicability of the present invention is recited in the claims that follow.

What is claimed is:

1. A system, comprising a network node configured to negotiate, with at least one other node, for connections for high priority calls received at the node in the face of otherwise congested outbound communication links, wherein the node is configured to negotiate for one or more voice channels to accommodate the high priority calls depending upon selected compression schemes for existing calls transported on the outbound communication links.

2. A system as in claim 1, wherein the negotiation is conducted in a fashion that will preserve connections for existing calls associated with the node.

3. A system as in claim 2, wherein the negotiation is conducted so as to cause one or more of the existing calls to consume less bandwidth over the outbound communication links than was consumed at a time prior to reception of the high priority calls.

4. A system as in claim 3, wherein the node is configured to initiate the negotiation depending on the availability of codec resources at the node.

5. A system as in claim 1, wherein the high priority calls comprise voice calls.

6. A system as in claim 1, wherein the node is configured to commence negotiations according to availability of codec resources at the node.

7. A method comprising managing a communication link between nodes of a communication network so as to ensure connection availability for one or more high priority calls over the communication link through dynamic renegotiations of call parameters for existing calls transported over the communication link, wherein the dynamic renegotiations comprise negotiations of compression schemes for the calls, wherein the calls are voice calls, wherein one of the nodes is configured to negotiate, with at least one other node, for one or more voice channels, depending upon selected compression schemes, and wherein the dynamic renegotiations are accomplished through the exchange of OAM cells between the nodes.

8. A method as in claim 7, wherein the communication link supports communications according to the Asynchronous Transfer Mode.

9. A method as in claim 7, wherein the dynamic renegotiations are supported according to codec availability at the nodes.

10. A method as in claim 9, wherein codec availability is determined according to profile information maintained by the nodes.

11. A method as in claim 9, wherein the high priority calls are determined as such according to database information regarding called numbers.

12. A network comprising:
a number of nodes connected through one or more communication links; and
a resource manager configured to allocate bandwidth over the communication links to high priority calls received at one or more of the nodes without dropping existing calls within the network through dynamic renegotiations of existing bandwidth utilization within the network, wherein the nodes each support multiple codec resources to compress voice information transmitted over the communication links, wherein the dynamic renegotiations comprise negotiations of compression schemes supported by the multiple codec resources for the calls.

13. The network of claim 12 wherein the resource manager is a distributed resource among the nodes of the network.

14. The network of claim 12 wherein the dynamic renegotiations are supported through the exchange of OAM cells between the nodes.

15. A system, comprising:
means for negotiating compression schemes for one or more high priority voice calls; and
means for managing a communication link between nodes of a communication network so as to ensure connection availability for the one or more high priority voice calls over the communication link through the means for negotiating compression schemes, wherein one of the nodes is configured to negotiate, with at least one other node, for one or more voice channels for one of the high priority voice calls depending upon selected compression schemes, and wherein the means for negotiating comprises means for exchange of OAM cells between the nodes.

16. A computer readable medium containing executable instructions which, when executed in a controller system, cause the system to perform the following comprising:

managing a communication link between nodes of a communication network so as to ensure connection availability for one or more high priority calls over the communication link through dynamic renegotiations of call parameters for existing calls transported over the communication link, wherein the dynamic renegotiations comprise negotiations of compression schemes for the voice calls, wherein the dynamic renegotiations are accomplished through the exchange of OAM cells between the nodes; and negotiating, between one node and at least another node, for one or more voice channels for one of the high priority voice calls depending on selected compression schemes.

17. The computer readable medium of claim 16, wherein the dynamic renegotiations are supported according to codec availability at the nodes.

* * * * *